(12) United States Patent
Paterson et al.

(10) Patent No.: US 8,294,958 B2
(45) Date of Patent: Oct. 23, 2012

(54) SCANNER SYSTEM AND METHOD FOR SCANNING PROVIDING COMBINED GEOMETRIC AND PHOTOMETRIC INFORMATION

(75) Inventors: James Paterson, Oxford (GB); Ronald William Daniel, Oxford (GB); David Claus, Oxford (GB); Andrew Fitzgibbon, Oxford (GB)

(73) Assignee: Isis Innovation Limited, Oxford (GB)

( * ) Notice: Subject to any disclaimer, the term of this patent is extended or adjusted under 35 U.S.C. 154(b) by 950 days.

(21) Appl. No.: 12/299,349

(22) PCT Filed: May 3, 2007

(86) PCT No.: PCT/GB2007/001610
§ 371 (c)(1),
(2), (4) Date: Nov. 17, 2008

(87) PCT Pub. No.: WO2007/129047
PCT Pub. Date: Nov. 15, 2007

(65) Prior Publication Data
US 2009/0080036 A1    Mar. 26, 2009

(30) Foreign Application Priority Data

May 4, 2006   (GB) .................................. 0608841.3

(51) Int. Cl.
*H04N 1/04* (2006.01)
(52) U.S. Cl. ......... 358/474; 358/1.9; 358/473; 358/530; 382/154; 382/162; 382/163; 382/167
(58) Field of Classification Search ................... 382/154
See application file for complete search history.

(56) References Cited

U.S. PATENT DOCUMENTS

| | | | |
|---|---|---|---|
| 4,912,336 A | 3/1990 | Nayar et al. | |
| 4,979,815 A | 12/1990 | Tsikos | |

(Continued)

FOREIGN PATENT DOCUMENTS

EP    1 422 495    5/2004

(Continued)

OTHER PUBLICATIONS

International Search Report for PCT/GB2007/001610, mailed Aug. 17, 2007.

(Continued)

*Primary Examiner* — Dung Tran
(74) *Attorney, Agent, or Firm* — Nixon & Vanderhye, P.C.

(57) ABSTRACT

A scanner system and corresponding method, the system comprising: a scanner device (1); a target 17) and a processor (21). The scanner device (1) comprises: an emitter (13) for projecting patterned light and a sensor (12) for capturing images of the object (19). The target (17) has predetermined features visible to the sensor simultaneously with the object for enabling the processor to determine the location of the sensor with respect to the object. The generates a three-dimensional model of the object on the basis of images of the object with the patterned light projected thereon. The scanner device further comprises a light source (14) for directionally illuminating the object (19), and the sensor (12) is arranged to capture images of the illuminated object. The processor generates sets of photometric data for the object when illuminated from different directions. The processor combines the geometric data and photometric data to output a model comprising geometric information on the object together with photometric information spatially registered with the geometric information.

34 Claims, 7 Drawing Sheets

U.S. PATENT DOCUMENTS

| | | | |
|---|---|---|---|
| 5,337,149 A | | 8/1994 | Kozah et al. |
| 5,446,549 A | | 8/1995 | Mazumder et al. |
| 5,974,168 A | | 10/1999 | Rushmeier et al. |
| 6,025,905 A | * | 2/2000 | Sussman .................. 356/3.01 |
| 6,166,853 A | * | 12/2000 | Sapia et al. .................. 359/559 |
| 6,437,823 B1 | | 8/2002 | Zhang |
| 6,542,249 B1 | | 4/2003 | Kofman et al. |
| 6,639,594 B2 | | 10/2003 | Zhang et al. |
| 6,677,942 B1 | | 1/2004 | Rushmeier et al. |
| 6,686,921 B1 | * | 2/2004 | Rushmeier et al. ........... 345/589 |
| 6,754,491 B2 | * | 6/2004 | Konno et al. ................ 455/434 |
| 6,850,872 B1 | | 2/2005 | Marschner et al. |
| 6,925,198 B2 | | 8/2005 | Scharlack et al. |
| 7,084,386 B2 | | 8/2006 | Bernardini et al. |
| 7,106,348 B2 | * | 9/2006 | Matsumoto et al. ......... 345/640 |
| 7,292,257 B2 | * | 11/2007 | Kang et al. .................... 345/629 |
| 7,372,981 B2 | * | 5/2008 | Lai et al. ...................... 382/118 |
| 7,399,220 B2 | * | 7/2008 | Kriesel et al. ................ 452/157 |
| 7,873,210 B2 | * | 1/2011 | Novosad ...................... 382/162 |
| 7,878,910 B2 | * | 2/2011 | Wells .............................. 463/46 |
| 7,907,792 B2 | * | 3/2011 | Harville ........................ 382/284 |
| 8,107,721 B2 | * | 1/2012 | Beardsley et al. ........... 382/154 |
| 2003/0231175 A1 | * | 12/2003 | Pfister et al. ................. 345/419 |
| 2004/0217260 A1 | | 11/2004 | Bernardini et al. |
| 2004/0234122 A1 | * | 11/2004 | Kochi et al. .................. 382/154 |
| 2005/0043614 A1 | * | 2/2005 | Huizenga et al. ............. 600/427 |
| 2005/0206971 A1 | * | 9/2005 | Chang .......................... 358/498 |
| 2009/0067706 A1 | * | 3/2009 | Lapa ............................. 382/154 |
| 2009/0167843 A1 | * | 7/2009 | Izzat et al. ...................... 348/43 |
| 2009/0323121 A1 | * | 12/2009 | Valkenburg et al. ......... 358/1.18 |

FOREIGN PATENT DOCUMENTS

| | | |
|---|---|---|
| WO | 2005/040850 | 5/2005 |
| WO | WO 2005/040850 A1 | 5/2005 |
| WO | WO 2005040850 A1 * | 5/2005 |

OTHER PUBLICATIONS

Written Opinion of the International Searching Authority for PCT/GB2007/001610, mailed Aug. 17, 2007.

Great Britain Search Report for GB Application No. 0608841.3, dated Sep. 11, 2006.

Saji, H. et al., "Measuring Three-Dimensional Shapes of a Moving Human Face Using Photometric Stereo Method with Two Light Sources and Slit Patterns", IEICE Transactions on Information and Systems, vol. E80-D, No. 8, pp. 795-801, (Aug. 1997).

Wu, Xian-Feng et al., "A Structured Light-Based System for Human Heads", Optics and Laser Technology, vol. 36, No. 5, pp. 387-391, (Jul. 2004).

David, James et al., "Spacetime Stereo: A Unifying Framework for Depth from Triangulation", Proceedings of the 2003 IEEE Conference on Computer Vision and Pattern Recognition, vol. 2, pp. 359-366, (Jun. 18, 2003).

Rushmeier, H. J. et al., "Design and use of an In-Museum System for Artifact Capture", IEEE/CVPR Workshop on Applications of Computer Vision in Archaeology, 7 pages, (Jun. 2003).

Paterson, James A. et al., "BRDF and Geometry Capture from Extended Inhomogeneous Samples Using Flash Photography", Eurographics, vol. 24, No. 3, 9 pages, (2005).

Bernardini et al, "Building a Digital Model of Michelangelo's Florentinen Pieta", IEEE Computer Graphics and Applications, 22:59067, 2002.

"Building a Digital Model of Michelangelo's Florentine Pieta", Bernardini, F., et al., IEEE Computer Graphics and Applications, IEEE Service Center, New York, NY, US, vol. 22, No. 1, Jan. 1, 2002 pp. 59-67.

"A versatile camera position measurement system for virtual reality TV production", Thomas, G A et al., Broadcasting Convention, 1997, IBS 97., International (Conf. Publ. 447) Amsterdam, Netherlands Sep. 12-16, 1997, pp. 284-289.

"Strategies for registering range images from unknown camera positions", Fausto Bernardini, Holly E Rushmeier: Three-dimensional Image Capture and applications III Proc. SPIE, vol. 3958, Mar. 7, 2000, pp. 200-206.

"Scanning and processing 3D objects for web display", Mohamed Farouk, Ibrahim El-Rifai, Shady El-Tayar, Hisham El-Shishiny, Mohamed Hosny, Mohamed El-Rayes, Jose Gomes, Frani Giordano, Holly Rushmeier, Fausto Bernardini, Karen Magerlein: Oct. 6-10, 2003, 3-D Digital Imaging and Modeling, 2003. 3DIM 2003. Proceedings. Fourth International Conference.

"The 3D model acquisition pipeline", F. Bernanrdini, H. Rushmeier, Originally published 2000, revised in vol. 21 (2002), No. 2 pp. 149-172 Computer Graphics forum.

"Marker Tracking and HMD Calibration for video-based Augmented Reality Conferencing System".Kato, H. Billinghurst, M. (1999) In Proceedings of the 2$^{nd}$ International Workshop on Augmented Reality (IWAR 99). October, San Francisco, USA.

"3D photography on your desk". Bouguet J. And Perona P. In proceedings of the International Conference on Computer Vision, pp. 43-52, 1998.

"Stripe Boundary Codes for real-Time Structured-Light Range Scanning of Moving Objects". Olaf Hall-Holt Szymon Rusinkiewics. Presented at the Eighth International Conference on Compouter Vison (ICCV 2001).

"Adaptive scanning for online 3D model acquisition". T. Koninckx, T. Jaeggli, and L. Van Gool. In IEEE International Workshop on Real Time 3D Sensors and Their Use—CVPRO4, 2004.

\* cited by examiner

SCANNER SYSTEM AND METHOD FOR SCANNING PROVIDING COMBINED GEOMETRIC AND PHOTOMETRIC INFORMATION

This application is the U.S. national phase of International Application No. PCT/GB2007/001610, filed 3 May 2007, which designated the U.S. and claims priority to Great Britain Application No. 0608841.3, filed 4 May 2006, the entire contents of each of which are hereby incorporated by reference.

BACKGROUND AND SUMMARY

The present invention concerns a system, and corresponding method, for scanning a real object. The object of the scanning may be an entire article, or a portion thereof, or the surface or portion of the surface of an article. The system and method of the invention is capable of the acquisition of geometry and material surface reflectance properties of the object of the scanning. Examples of such material surface reflectance properties include the surface colour and specularity, which may also be referred to as reflectance properties.

Systems are known for 3D geometric acquisition of the shape of an object, for example as disclosed in WO 2005/040850. However, geometric information alone is not always sufficient for particular scanning applications, such as full colour model acquisition for example for video games and animated films (e.g. scanning and reconstructing a figure for subsequent animation), interactive visualization (e.g. for medical uses or for academic use such as scanning antiquities for subsequent study), and quality control (e.g. inspecting the surface finish of an object for desired gloss or satin finish, inspecting completeness of paintwork on a painted object).

Figure 1:
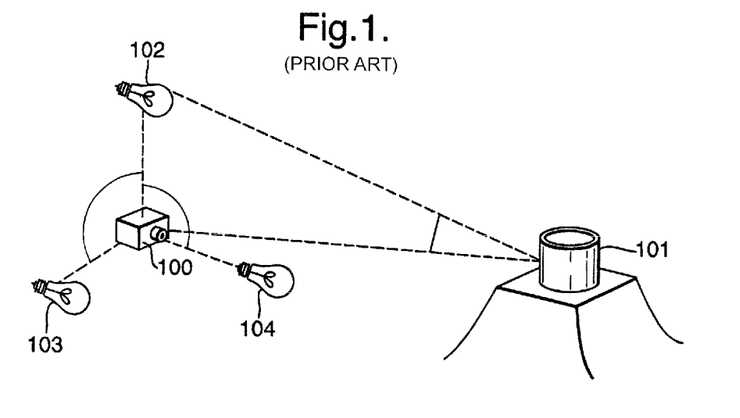
FIG. 1 depicts a previous system for acquiring photometric stereo information on an object.

Other systems are known for acquiring information on an object via "photometric stereo" (PS), i.e. obtaining spatial information on the properties of the interaction of the surface of an object with light. FIG. 1 shows an example of a traditional hardware setup for object acquisition via photometric stereo. A single camera 100 is positioned to capture images of an object 101 illuminated individually and sequentially by a number of light sources 102, 103, 104, the geometrical positions of the light sources with respect to the object having been obtained via prior calibration. In FIG. 1 three light sources are shown, which represents a typical minimum setup. However, there are problems and limitations with such a system: for example, depending on the material reflectance model used, the determination of the PS information for the object can be intractable or require an extremely large amount of processing power or time. The range of applicable materials may be very limited, for example objects which exhibit specular reflection cannot be correctly acquired. The use of additional light sources and more advanced reflection models can assist, but this increases the hardware requirements and the difficulty of calibration. Furthermore, a PS system as described above is inconvenient to operate and to set up, in particular multiple geometrically and radiometrically calibrated light sources are required. It does not lend itself to enabling convenient, moveable (such as hand-held) scanners to be achieved. PS data in which the geometry is recovered by integration also suffers from the problem of being "non-metric" in the sense that it does not provide absolute height, width and breadth information, and can be subject to low-frequency drift due to the integration, implying a possible curvature in space.

A further problem is to register and combine, i.e. reconcile, geometric data and photometric data for an object acquired with different techniques.

The present invention aims to alleviate, at least partially, one or more of the above problems.

Accordingly, the present invention provides a scanner system for scanning an object, the system comprising:

a scanner device; a target; and a processor, wherein the scanner device comprises: an emitter for projecting patterned light on the object; and a sensor for capturing images of the object, wherein the target has predetermined features visible to the sensor simultaneously with the object for enabling the processor to determine the location of the sensor with respect to the object, wherein the processor is arranged, in use, to generate geometric data, comprising a three-dimensional model of the object, on the basis of images of the object with the patterned light projected thereon by the emitter, wherein the scanner device further comprises a light source for directionally illuminating the object, and the sensor is arranged to capture images of the object illuminated by the light source, wherein the processor is arranged, in use, to generate sets of photometric data for the object when illuminated from different directions by the light source, and wherein the processor is arranged, in use, to combine the geometric data and photometric data to output a model comprising geometric information on the object together with photometric information spatially registered with the geometric information.

The present invention also provides a method for scanning an object comprising steps of:

providing a target that has predetermined features, and capturing images of the object and target features simultaneously using a sensor;

determining the location of the sensor with respect to the object on the basis of the captured images;

projecting patterned light on the object;

generating geometric data, comprising a three-dimensional model of the object, on the basis of images of the object with the patterned light projected thereon;

directionally illuminating the object using a light source;

generating sets of photometric data for the object when illuminated from different directions by the light source; and combining the geometric data and photometric data to output a model comprising geometric information on the object together with photometric information spatially registered with the geometric information.

A system embodying the invention is able to offer advantages including improved accuracy, reduced cost and increased usability over conventional technologies, and may be produced in a portable hand-held package. As well as the standard applications for 3D geometric acquisition (such as e.g. reverse engineering, quality control), the system's ability to capture material surface reflectance properties such as inhomogenous colour and specularity make it applicable for a wide range of other fields, such as full colour model acquisition, interactive visualization, and material analysis for example quality inspection of paint work or surface finish.

A system or method embodying the invention advantageously only requires a single sensor (e.g. camera) for capturing images of the object. Furthermore, a system embodying the invention advantageously only requires a single light source, which may be a composite light source, but the light source can be compact with a maximum dimension of say 150 mm or smaller. Also, additional backlighting sources are not required. All of these features enable the scanner device of the invention to be made portable, and preferably hand-held. Of course, multiple light sources may optionally be used if the application requires it, but the scanner device itself can still be a single, portable, preferably hand-held unit,

BRIEF DESCRIPTION OF THE DRAWINGS

Embodiments of the invention will now be described, by way of example only, with reference to the accompanying drawings in which.

DETAILED DESCRIPTION OF EXAMPLE EMBODIMENTS

Figure 2:
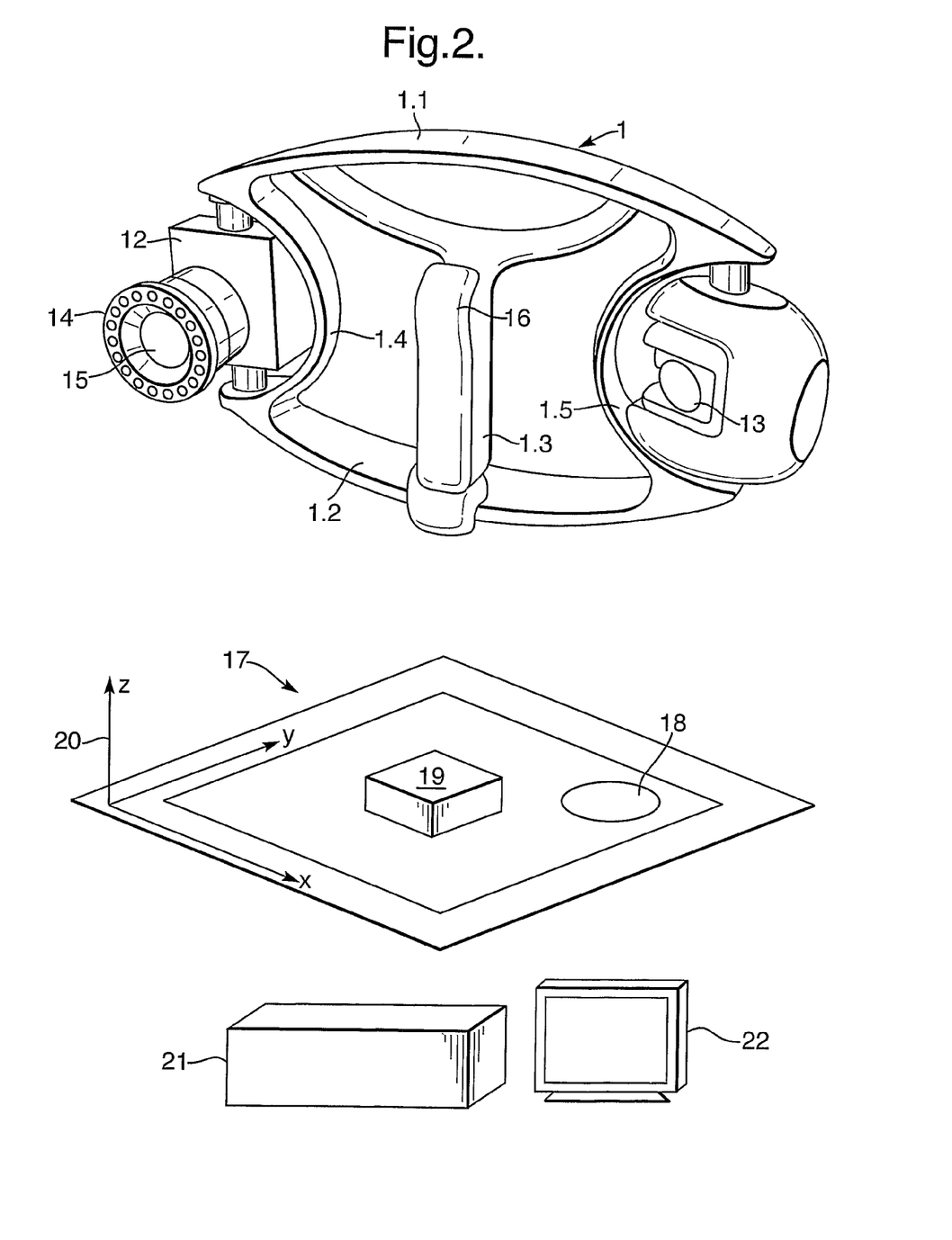
FIG. 2 depicts a system comprising a scanner, optical target, object and processor according to a first embodiment of the invention.

A system according to a first embodiment of the invention will now be described. FIG. 2 shows the hardware component of the system, which in this embodiment consists of a hand-held scanning device 1, optical target 17, and processor 21. Components of the hand-held scanner 1 include: the main body of the scanner 1, upon which the remaining components are attached; a camera 12; a laser stripe projector 13 or other suitable source for projecting one or more planes of light onto the target 17 and object thereon to produce a line or stripe of light visible to the camera 12; and at least one photometric light source 14. Components 1, 12 and 13, together with the optical target 17, are described in the publication WO 2005/040850; the photometric light source 14 is an addition to form the system that is the focus of the present invention.

FIG. 2 the photometric light source 14 is a bright light composed of multiple LEDs arranged in a ring around the camera lens 15, although this is by no means the only configuration, and additional lights such as e.g. a clustered LED source placed next to the laser stripe projector 13 may be advantageous. In the depicted embodiment, the photometric light source is arranged to be substantially co-linear with the camera lens 15; in this context, "co-linear" simply means that the object is illuminated from substantially the same direction as that from which it is viewed, although this is not an essential feature of the invention. The LEDs referred to here emit blue light that interacts with one or more phosphors in their package to generate approximately white light. Other sources can, of course, be used, such as a camera flash bulb.

The main body of the scanner in the embodiment depicted in FIG. 2 consists of a frame comprising two spaced-apart lateral members 1.1, 1.2, joined by three bars 1.3, 1.4 and 1.5, approximately perpendicular to the lateral members. The middle bar 1.3 constitutes a hand grip and is provided with a trigger 16, the trigger being used to switch laser generation on or off. Additional controls may also be provided on the scanner 1 e.g. for switching the photometric light source(s) on or off. The camera 12 and laser stripe projector 13 are provided adjacent to respective end bars 1.4 and 1.5 of the scanner. A further feature of this particular embodiment is that the camera 12 and laser stripe projector 13 are adjustable with respect to the scanner body about the vertical axis. This is achieved by attaching these two components to the main scanner body 1 via a rod and socket, and allows the hand-held scanner 1 to have adjustable baseline between camera 12 and laser source 13 to accommodate differently sized objects.

The camera 12 is any suitable electronic image sensor, for example using a CCD or CMOS light sensor element, and a lens or lens system 15 for focusing an image of the object 19 and target 17 onto the sensor element.

The optical target 17 consists of a planar target with pattern of known dimensions, in this instance a black square with surrounding line. An orientation marker, in this case a white circle 18, is placed in the upper left of the black square. It should be understood that the optical target can take other forms, such as a three dimensional shape, however its metric dimensions must be known in advance up to a specified accuracy (the metric properties of the target are discussed in WO 2005/040850). An additional property of the optical target is that it is of known reflectivity, for example in the case of using white card with laser printing, the card is known to be matte and substantially equally reflective across the spectral range of visible light (an additional calibrating property available in the new technology being described in this document). Target geometry and reflectance properties can be calibrated in advance as required. During operation the object to be acquired 19 is placed on the target 17, which may vary in overall scale depending on the size of the object being acquired. In the embodiment described below during operation the hand-held scanner is moved with respect to the stationary target, however in other embodiments the scanner may remain fixed, with the target moving relative to it, for example in the case of examining parts moving on a conveyor belt with multiple affixed targets.

The processor 21 may be a standard desktop or laptop computer, and is required to perform the image and data processing necessary for the various functions of the system, as well as storage of intermediate and final data describing the acquired object. An attached CRT or LCD monitor 22 allows display of intermediate and final data to the user, along with controls for interaction. The scanner 1, processor 21 and monitor 22 may be connected by cables for communication of data. Alternatively, communication between the components may be wireless. It is also not essential for the processor 21 to be external to the scanner; with appropriate miniaturization, the necessary dedicated processor hardware and display may be provided integrally in the hand-held scanner.

A method of operation of the scanner system, according to an embodiment of the invention, will now be described in terms of the following functions performed, namely: camera localization; metric recovery of geometric shape data of the object; acquisition of photometric data of the object; and combination of the geometric data and photometric data to produce a refined model of the object's geometry and surface reflectance properties.

As described in WO 2005/040850, the first function of the system is to perform optical camera localization, i.e. determining the position of the camera in space (specifically camera roll, tilt, and yaw angles and effective camera centre coordinates X,Y,Z) with respect to a chosen absolute coordinate frame on the target, shown in FIG. 2 as a set of axes 20. As the target is of a known metric size the relative position of the camera can be determined metrically given knowledge of certain camera imaging properties such as e.g. focal length. Geometric calibration of a camera is a known technique and can be performed in an image-driven approach. In one example of this, multiple images of a 2D camera calibration target of known feature dimensions are acquired, the calibration target not necessarily being the same one as used during object scanning. Image processing operations are then performed to extract the locations of features on the target in the calibration images, then a series of operations based on projective geometry used to obtain parameters determining the camera's imaging properties.

With knowledge of the camera's imaging characteristics (or intrinsic parameters) metric localization of the camera with respect to the optical target 17 can be performed from a single image of the target. This is achieved by finding certain specific features of the target in the image (for example the sides of the line surrounding the centre black square of the target), then applying projective geometry to determine a homography from the coordinate frame of the target to the camera. WO 2005/040850 gives further details of camera localization via imaging an optical target.

Figure 3:
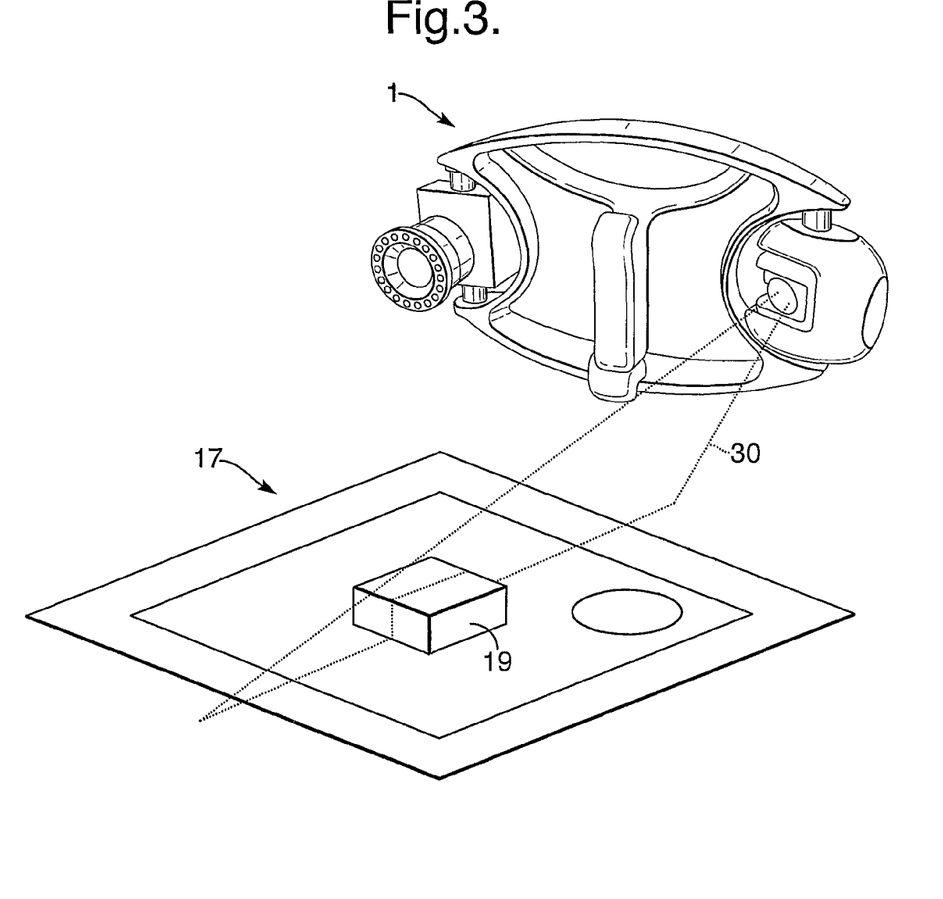
FIG. 3 depicts the system of the first embodiment acquiring geometric information.

As described in WO 2005/040850, the second function of the system is to perform metric recovery of geometric shape information from the object. FIG. 3 demonstrates this process. A plane, or multiple planes, of light 30 is projected onto the target 17 and the object thereon 19, from the scanner 1. A calibration phase (not shown) determines the relative distance and orientation of the plane or planes of light with respect to the effective camera centre, which remains fixed during the scanning process. The output from the localization function provides the position and orientation of the camera with respect to the optical target, and hence the angle and relative position of the light plane with respect to the target. Image processing routines are applied to detect the position of the light stripe in the image, both on the object and on the target, which is straightforward as the stripe is very intense compared to ambient light from e.g. standard room lighting. Knowledge of the position and orientation of the target plane in the image thus allows the intersection of the or each light plane with the target plane to be determined. Information on the geometric shape of the object placed on the target can then be determined from the distortion observed in the light line in the camera image. Detection of the stripe on the target is used to improve the accuracy of the geometric recovery using disparity. The result is to acquire a single "strip" of metric geometric samples (i.e. 3D points) across the object. The light line is preferably "swept" over the object in order to acquire a set of samples of the surface of the object.

Particular advantages of the target based approach to geometry acquisition include the removal of costly precision camera localization equipment (equivalently the removal of accurate object moving equipment such as e.g. precision turntables), and that geometric recovery is now performed with respect to a known metric object in view, reducing errors to second order. Acquisition of 3D data with respect to an absolute coordinate frame also allows statistical modelling to be applied to further reduce overall error. WO 2005/040850 gives further details. It should be noted that the geometry recovered here is metric, however it will be subject to a level of unbiased measurement noise depending on e.g. accuracy of camera localization, geometric calibration and laser stripe localization in the image. It is important to note that the use of the reference metric optical target generates unbiased measurements that are subject to spatial high frequency noise.

Other systems admit bias through their reliance on measurement arms and other features that must be separately calibrated and registered to the object coordinate system.

The third function of the scanning system is to perform photometric acquisition of the object. The fundamental principle applied is that of photometric stereo (PS). The underlying concept is to acquire a series of photometric images of the object via the camera, with the images consisting of the object remaining in a fixed position relative to the camera but with geometrical variation in the lighting conditions.

Photometric stereo requires an approximating model of the object's (possibly inhomogeneous) material reflectivity properties, which in the general case is modelled via the Bidirectional Reflectance Distribution Function (BRDF). To render the problem tractable, typically a very simplified model of the BRDF is used, for example the Lambertian Cosine Law model. Here material reflectivity is expressed as uniform across all variation of direction of incoming irradiance and exitant radiant energies. In this simple model variation in intensity across the object as observed by the camera is dependent only on the quantity of incoming irradiant energy from the light source and foreshortening effects due to the geometry of the object. In particular $$I = P\rho L \cdot N \qquad \text{(Eqn 1)}$$

Where I represents the intensity observed at a single point on the object by the camera, P the incoming irradiant light energy, N the object-relative surface normal, L the normalized object-relative incoming light direction, and $\rho$ the Lambertian reflectivity of the object at that point.

In a standard implementation of PS, variation in P across the object is typically determined approximately in a prior calibration step, and hence can be compensated. In the case of the conventional example of FIG. 1 the relative orientation of the camera and object remains fixed during each change in lighting direction. The intensity observed by the camera at a specific location (i.e. pixel) in the set of photometric images must always correspond to the same area on the surface of the object. The intensities at a particular pixel location in the image can therefore be considered as a set of photometric samples from the surface of the object visible at that pixel location in the camera view. Let the N intensities and corresponding light directions for a particular set of photometric samples be denoted by superscript, then $I^N = \rho L^N \cdot N$ (where • denotes vector dot product). Note that $L^N$ has been determined via prior calibration (this can be achieved via e.g. a so-called "sundial" approach, see for example: Rushmeier et al. *Design and use of an in-museum system for artefact capture*, IEEE/CVPR Workshop on Applications of Computer Vision in Archaeology 2003, and as described herein in the context of the second embodiment of the invention). Then stacking the vectors N (Eqn 1) from the N photometric samples gives:

$$\begin{bmatrix} I^1 \\ I^2 \\ \vdots \\ I^N \end{bmatrix} = \rho \begin{bmatrix} L_X^1 & L_Y^1 & L_Z^1 \\ L_X^2 & L_Y^2 & L_Z^2 \\ \vdots & \vdots & \vdots \\ L_X^N & L_Y^N & L_Z^N \end{bmatrix} \cdot \begin{bmatrix} N_X \\ N_Y \\ N_Z \end{bmatrix} \qquad \text{(Eqn 2)}$$

Which can be solved in a least squares sense via e.g. psuedoinverse. The surface normal is of unit length, hence the derived surface normal N is normalized, with $\rho$ taken as norm (N).

It should be clear from this description that PS can, given an appropriate and tractable model of material reflectivity, be used to derive object geometry in the form of a set of surface normals, and material properties (in the example above possibly inhomogeneous Lambertian reflectivity coefficients). This is a known standard technique. It is also possible to perform a similar operation with colour photometric images (such as the R,G,B channel images common in model digital imaging), recovering knowledge of e.g. the object's diffuse albedo.

Figure 4A:
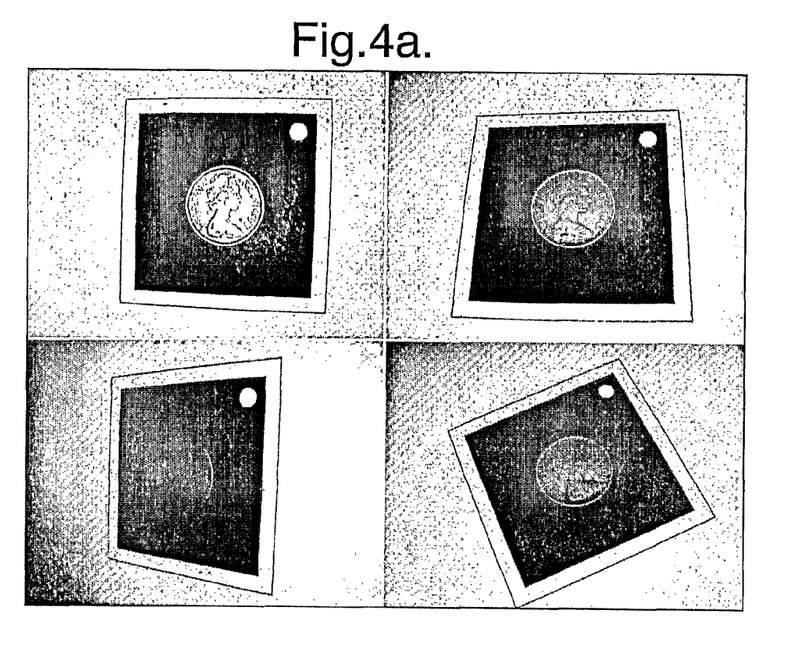
FIG. 4a shows a set of photometric images of an object acquired by the system of FIG. 2 from different viewpoints.

The scanning system of this embodiment of the invention improves on the prior arrangement of FIG. 1 by attaching at least one photometric light source to the scanner, which is itself freely moveable with respect to the object. This allows the acquisition of a potentially unlimited number of photometric images in that any light sources can now be arbitrarily positioned, as long as the object remains in view of the camera and in the illumination path of the light source. In the example of the hand-held scanner of FIG. 2, a single camera co-linear light source 14 is shown. The issue now is that moving the light source (and hence camera) results in the position, orientation, and potentially the visibility of the object (due to self-occlusion) changing in the image. This results in the position of the photometric sample corresponding to a particular region of surface geometry varying between photometric images; in addition object self-occlusion with respect to the camera or light may result in photometric samples for a particular region being unavailable in some or all of the photometric images. FIG. 4(a) illustrates this, showing a set of photometric images of an object (a coin) acquired by moving the camera-light system i.e. scanner 1. Clearly the geometry observed under the pixels of the images varies across the set. A major component, therefore, of the scanning system is to process the captured photometric images such as to obtain a set of geometrically aligned photometric samples.

Figure 5:
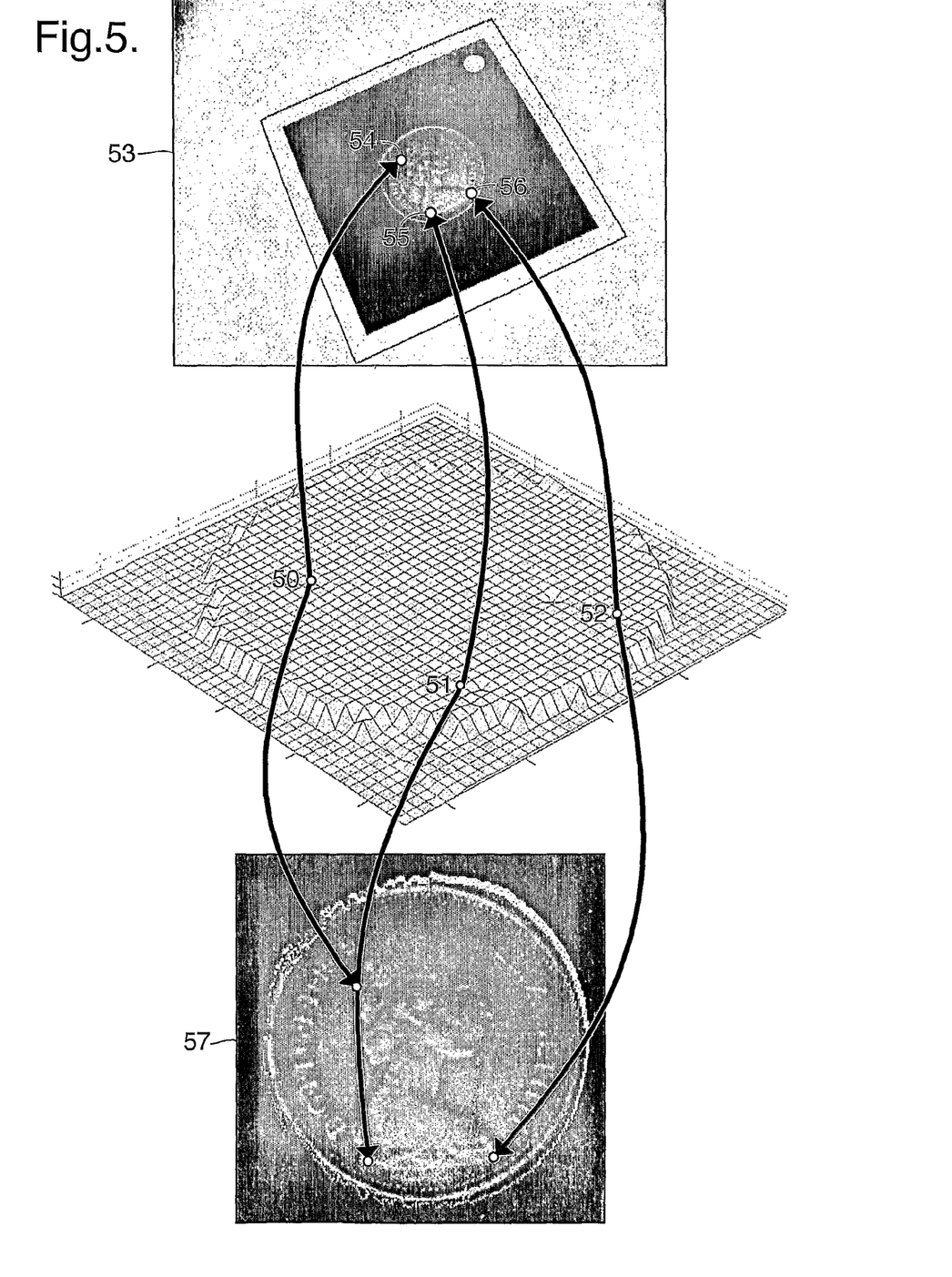
FIG. 5 depicts schematically the processing to transform one of the images from FIG. 4a to the corresponding image in FIG. 4b.

In this described embodiment the approach taken will be to rectify the captured photometric images to a common orientation, in doing so determining surface visibility. This requires prior knowledge of the object's metric geometry, as provided by the laser scanning component of the system. Thus the photometric component of the system is dependent on data from the laser component, and as the rectification improves with the quality of the metric data the photometric component is clearly enhanced by improved performance in the geometric acquisition stage. Rectification of a photometric image is performed by projecting previously acquired metric geometry into the image. This requires knowledge of the camera position and orientation used to acquire the image (obtained from the optical localization stage of the system) and camera imaging parameters such as e.g. focal length (acquired during camera geometric calibration). Other parameters such those defining a model of camera radial distortion can optionally be applied to improve the accuracy of the projection of the model. The result of projection is to obtain the 2D locations of the points comprising the 3D surface geometry in each photometric image. A re-projection of the object at an arbitrary viewpoint is then achieved by rendering the object, assigning colour value to the vertices as provided by sampling the original image. FIG. 5 shows an example of model projection—the 3D data of the model 50,51,52 is projected into the image 53 to provide 2D locations of the geometry in the photometric image 54,55,56. The photometric image is then sampled at these locations and the model rendered with these colour values to construct a rectified view at a chosen canonical viewpoint 57, in this case fronto-parallel to the major plane of the coin.

The metric 3D data itself provides only a set of 2D sample locations in the photometric images. To determine visibility the surface of the object must be defined in some form. One example of this is to define triangle-based connectivity between the points. This is trivial if the points are e.g. defined as height samples on a regular sampling grid (as is easily performed given the metric data is acquired with respect to a metric planar optical target in our system). In the case of an arbitrary cloud of points defining a convex object e.g. the 3D Delaunay triangulation can be applied. Other schemes and representations exist, such as Radial Basis Function methods for defining implicit surfaces. Having obtained a surface representation, visibility with respect to the camera can be determined by e.g. ray casting from the camera centre through the object, or by projecting the surface into the image as a set of e.g. raster filled triangles, using standard depth buffer techniques to obtain the closest point to the camera at each pixel in the image. Occlusion with respect to the light (i.e. self-shadowing) can be determined in a similar manner, in this case casting rays from the effective centre of the light, or rendering a depth buffer from the perspective of the light source (a component of the shadow buffering technique known in computer graphics).

Figure 4B:
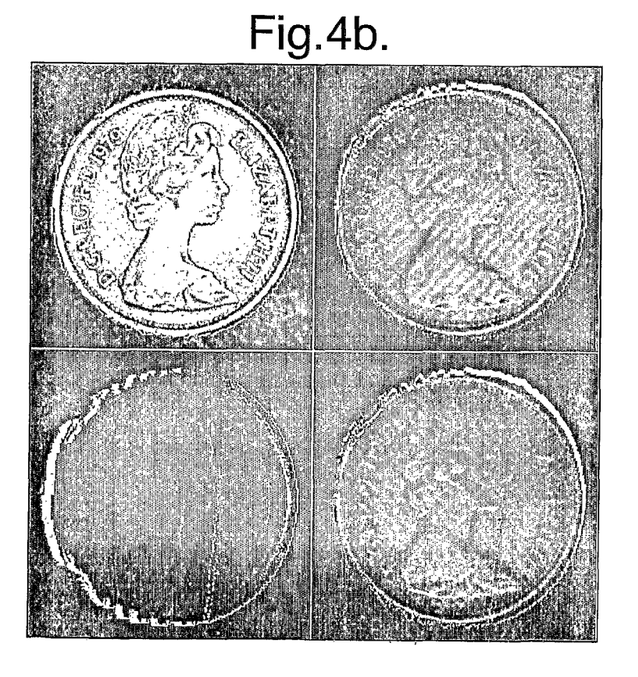
FIG. 4b shows the photometric information from FIG. 4a after processing to give a set of reconstructed images from the same viewpoint, but effectively illuminated by a light source from different directions.

The result is to determine the 2D location and visibility of each 3D point representing the object geometry in each image. In this description of the system the photometric images are then sampled at these locations to reconstruct the photometric images from a single canonical viewpoint, thus performing rectification. FIG. 4(b) shows an example of this; the input photometric images (FIG. 4a) show the object under varying camera-relative pose and orientation. After projecting the model into the images a set of corresponding rectified views are obtained, with the major plane of the coin fronto-parallel to the reconstruction viewpoint (FIG. 4b). Note that in some of the photometric images the object geometry is determined to be occluded with respect to the camera, and thus cannot be recovered in the rectified view; these samples are shown as pale grey pixels in FIG. 4b. Thus there may be a varying number of photometric samples across the locations in the rectified images.

Having obtained a number of sets of geometrically aligned photometric samples (i.e. FIG. 4b), it remains to determine the incident light direction (denoted L above) under which each sample was taken. It has already been commented that the camera location can be determined with respect to the optical target and hence any point on the object via the localization function of the system. Consider now that the light source rigidly attached to the camera during acquisition; then if the camera-relative position of the light is obtained via a pre-calibration step (this again can be achieved via e.g. a sundial type approach) the light position can be derived for each photometric image. In particular, given camera relative light position $L_C$, camera rotation and translation with respect to the target as matrix R and vector t, then:

$$L_T = R^T(L_C - t) \quad \text{(Eqn 3)}$$

Where $L_T$ gives the target relative position of the light, and $R^T$ denotes the transpose of matrix R. The photometric samples may now be processed to recover geometry with respect to the target coordinate frame and material reflectance properties as described in e.g. Eqn 2.

In the disposition above, the example of rectifying the images to a single canonical viewpoint has been given to aid understanding, however in a more advanced implementation multiple viewpoints may be used, and indeed are required to recover objects of more complex geometry than the coin. Extending to the general case, it is possible to recover photometric samples in a viewpoint-free manner, extracting sets of photometric samples for individual surface locations on any arbitrary 3D geometry.

The final function of the systems is to combine the acquired geometric and photometric data to produce a final model of the object's geometry. Material properties such as colour may be expressed as e.g. standard texture maps and are independent of this process. The geometric data provides an unbiased but noisy metric estimate of model geometry, typically at a relatively lower spatial resolution than the photometric sampling. The photometric data provides a relatively high resolution but biased estimate of the differential of the object geometry as a set of surface normals. Integrating the surface normals can produce an estimate of underlying model geometry, however this is subject to low frequency distortion and hence is not metric. The combination of the two modalities of data is therefore very powerful as it potentially offers metric accuracy and high acquisition resolution.

Various different techniques can be applied to combine the two sets of data to produce a final model. A simple example is when the metric height data is represented as a 2D grid of distances off the target plane (also known as a height or distance map), and the surface normals are represented by a similarly sampled 2D array. Note that in the case of higher normal resolution the height map may be interpolated via e.g. linear or cubic interpolation to obtain an estimate of metric geometry at the same sampling rate. The two data sets can then be combined using a filter.

The two sets of data, i.e. laser-scanned geometric and PS, have very different noise characteristics. The laser data is metric, with low bias, but is subject to high frequency spatial noise. The laser data can be thought of as a low frequency mean field measurement of points on the scanned object's surface. The PS data, on the other hand, is non-metric and provides information on the normal to the object's surface on a very high density sample grid. The system thus offers two sensor modalities, one generating noise corrupted estimates of the surface locations in 3D, the other providing the spatial derivatives of the object's surface. The two sensor modalities are combined to optimise their individual noise characteristics, the laser scanner providing low frequency information and the PS the high frequency information.

The mathematical description of the operation of integration of the two sensor modalities can be illustrated by considering the discrete models $$z = \hat{z} + n_1$$

$$(\delta z)_x = (\delta \hat{z})_x + n_2$$

$$(\delta z)_y = (\delta \hat{z})_y + n_3 \quad \text{(Eqn 4)}$$

where z denotes a measurement of a surface position; $n_1$, $n_2$ and $n_3$ are three independent noise sources corrupting the true measurements denoted by the 'hat' sign ^; ($\delta z$) denotes spatial derivative of the surface location with respect to 'x' and 'y' as indicated by the following subscript. The laser scanner data is modelled by the upper equation and the PS data is modelled by the lower equations.

There are many ways of combining the two measurements modelled by Equation 4. One particular apposite method is to use a Wiener filter. A Wiener filter is the steady-state solution for the optimal state estimation problem as solved using a Kalman filter. A Wiener filter is of particular value when there are measurements of a derivative of a signal, such as in the case of the combination of laser scanned geometry and PS data. The Wiener filter is the result of finding the minimum variance estimate of the steady state reconstructed height.

The Wiener filter is obtained by finding the Fourier transforms of the measurement signals and assuming that these signals were generated by white noise processes and are corrupted by measurement noise of known frequency spectrum. In this embodiment we assume that, by way of example, the noise processes are themselves white.

If the estimated value of the object's surface position is denoted as $\bar{z}$ then the Wiener filter minimises $$E[\iint (\bar{z} - z)^2 dx dy] \quad \text{(Eqn 5)}$$

where E[ ] denotes the expected value.

An alternative is to approach the integration in a deterministic manner in which a measurement 'd' is obtained from the three measurements in equation 4 by using the equation $$d = \iint |\bar{z}_x - \hat{z}_x|^2 + |\bar{z}_y - \hat{z}_y|^2 + \lambda |\bar{z} - \hat{z}|^2 dx dy \quad \text{(Eqn 6)}$$

Here lambda specifies an overall relative weighting on the original height data. Increasing lambda restricts the output to be closer to the original metric data. In practice this may be achieved very quickly in the frequency domain via use of standard techniques such as the Fast Fourier Transform (FFT). The use of frequency domain transforms in integrating normal data is also demonstrated in the published literature, however there is no attempt to combine with metric data. Note that the use of the FFT here is to achieve speed rather than solving a least-squares problem, as in the Wiener filter. Other techniques may also be employed, for example using the Fast Wavelet Transform.

The result of this process is to output high resolution, high-accuracy geometrical information on the object (such as a height map), together with reflectance information (i.e. material properties of the object, such as surface finish) spatially registered with the geometric information. This information has been obtained from noisy, medium resolution geometric data and biased, low accuracy photometric data. The output information can be further processed for provision to a modelling application, such as a conventional CAD or animation application or the like.

It should be noted that there is no inherent need to acquire the photometric and geometric data in distinct phases, and indeed there may be inherent benefits in not doing so. It has been shown above that prior knowledge on metric shape is essential in order to achieve photometric recovery with a moveable camera. It is also noted that prior knowledge on the surface geometry can aid the laser scanning process by e.g. allowing the prediction of where specular highlights might occur in the camera image (potentially leading to false laser line detections). High resolution estimates of surface normals can also be used to quantify varying surface roughness to detect areas with a high likelihood of laser "speckle", again leading to false line detections.

Multiple interacting passes of photometric and geometric acquisition may therefore increase the accuracy and overall quality of the data characterizing the object. Photometric characterization of objects of complex geometry may require many images with a wide variety of camera locations. The combined photometric-geometric system is well suited to provide this and may, for instance, provide an on-line display to an operator as to the quality (e.g. number of samples and variability of camera/light location) of the photometric data acquired across the object geometry, and/or may indicate to the operator the directions from which more photometric data should be obtained. These benefits are of course made possible by the target based system as it greatly facilitates and extends the usability of the photometric acquisition, and is in contrast to previous photometric/geometric systems which typically have distinct hardware and acquisition phases, having fixed variation in photometric geometry.

Figure 8:
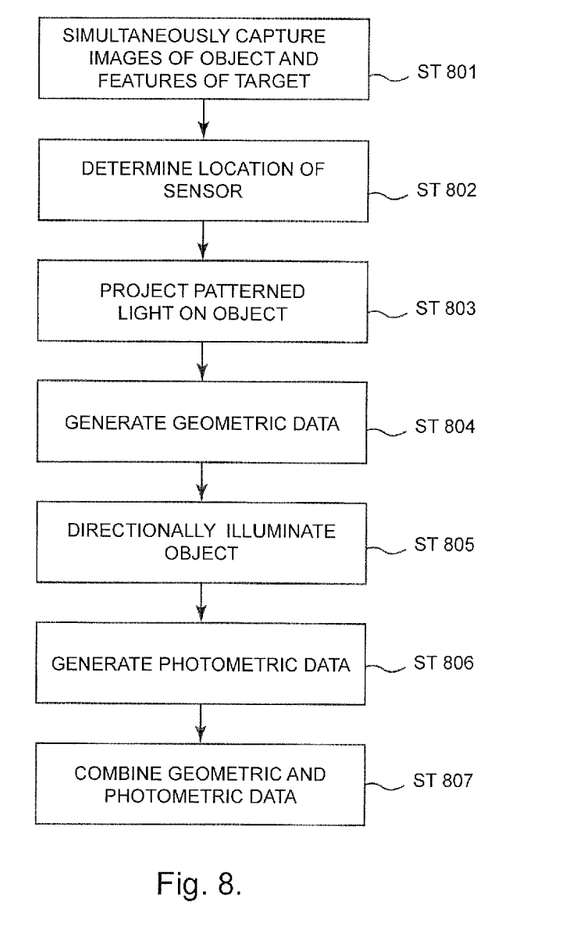
FIG. 8 is a flowchart of an example method.

FIG. 8 is a flowchart showing the example scanning methodology for scanning an object described above. The scanning uses a scanning device that includes an emitter for projecting patterned light on the object, a sensor for capturing images of the object and a light source for directionally illuminating the object. At ST 801, images of the object and features of a target are captured simultaneously using the sensor. At ST 802, the location of the sensor with respect to the object is determined on the basis of the captured images. Patterned light is projected on the object using the emitter (ST 803) and geometric data is generated on the basis of images object with the patterned light projected thereon (ST 804). The object is directionally illuminated using the light source (ST 805) and photometric data is generated for the object (ST 806) when illuminated from different directions by the light source. The geometric data and the photometric data are combined at ST 807 to output a model comprising geometric information on the object together with photometric information spatially registered with the geometric information.

A second embodiment of the invention will now be described which comprises a system capable of acquisition of geometry and material properties such as colour from a real object. In this embodiment the focus is on acquisition of geometry and material properties from a surface such as a wall or floor rather than an entire object. Applications for this particular embodiment are more specialized than the general object scanner described previously in FIG. 1, however they include acquisition of surfaces for synthetic environments such as film or video games, capture of carvings or hieroglyphics, and high detail capture of wrinkles, scars or other body features for quantitative analysis of cosmetic surgery.

Figure 6:
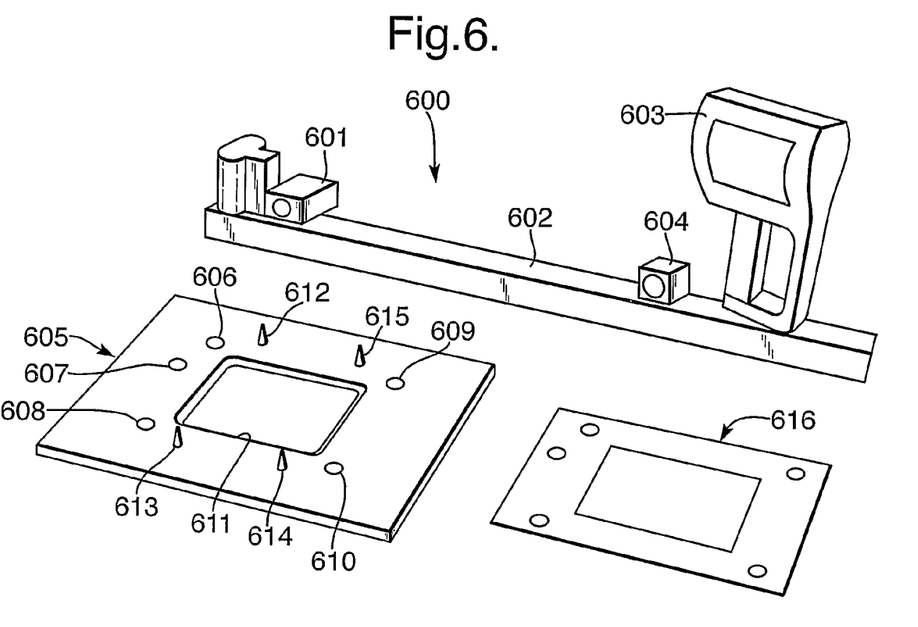
FIG. 6 illustrates a system according to a second embodiment of the invention.

FIG. 6 shows some hardware components of this embodiment. The first part 600 of the system comprises a digital stills camera 601 attached on a rigid boom 602 to at least one photometric light source 603. In this example the light source 603 is a high-power photographic flash gun, however other light sources such as a LED or standard bulb source may be used. It may also be of benefit to attach additional photometric lights, such as a ring-flash to the camera 601. In addition to the photometric light source 603 or sources at least one laser stripe source 604 is also attached to the boom, and may be triggered synchronously or asynchronously with the photometric light source(s) 603. The second hardware component is an optical target 605, similar in essence to the optical target 17 of FIG. 2. Primary differences are in the geometric pattern applied on the target (in this case a pattern of five dot fiducials 606-610), the hole 611 in the centre of the target 605 and the four cones 612-615 used for light source calibration. A third optional hardware component is a lightweight printed target 616 consisting of a cardboard sheet with an identical geometric pattern of dots (fiducials) to those of the target 605.

Figure 7:
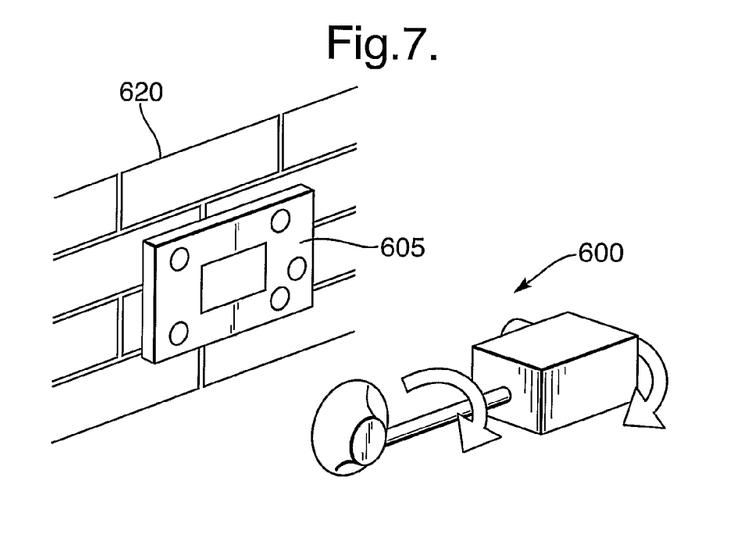
FIG. 7 depicts the system of FIG. 6 in use.

The use of this system is similar to that of the previous embodiment, however, rather than placing an object on the target 605, instead the target 605 itself is attached to the surface under inspection, such as the wall 620 in FIG. 7. The objective is to perform a largely photometric driven reconstruction of this surface using minimal metric data from the laser striper. This is performed by taking a series of still images of the target 605 (with the surface visible through the aforementioned hole 611) then processing the images offline. The arrows in FIG. 7 depict moving and rotating the boom of the system 600 between acquiring successive images in order to obtain images from different view points illuminated from different directions. The flash 603 and laser striper 604 are fired with each image acquisition of the camera 601, respectively providing photometric and metric information about the target 605. As with the disclosure earlier, reconstruction of the surface requires knowledge of:

1) the physical parameters of the optical target 605 (known by design);

2) the intrinsic parameters of the camera 601, such as focal length (camera calibration can be carried out by well known image-based methods);

3) the location of the camera 601 with respect to the target 605 in each image (computable from the observed orientation of the target fiducials 606-610 in a manner similar to the previous embodiment);

4) the location of the light source 603 with respect to the target 605 in each image; and 5) the location and orientation of the laser striper 604 with respect to the target 605 in each image.

Requirements 4) and 5) can be reduced to finding the location of the light source 603 and striper 604 with respect to the camera 601, as these components are rigidly affixed on the boom 602. In this case knowledge of 3) allows the transformation of camera-relative locations into target relative location for each captured image.

Camera-relative stripe position may be found using standard techniques as disclosed in e.g. WO 2005/040850. In the embodiment of FIG. 6, camera-relative light position is found by observing the triangular shadows cast by the cones 612-615 onto the target 605, in a manner similar to the traditional sundial. The height of the cones 612-615 is known in advance and thus the position of the light 603 can be found by intersecting rays from the tips of the cast shadows through the known geometric tips of the cones 612-615 on the target as known in the art.

In practice, a calibration phase is performed in advance using the target 605, which may be made of metal. Then a capture phase is performed using the lightweight target 616 attached to the actual surface that is the object being scanned. This has the advantage that only the lightweight target 616 needs to be carried around, which is more convenient, and is easier to attach onto surfaces. Alternatively, in principle, both calibration and capture could be performed using a single target 605, and the lightweight target 616 would be unnecessary. With both this embodiment and the previous embodiment, the scanner may be supplied pre-calibrated if the position and orientation of the camera relative to the light source and striper are fixed.

Photometric recovery is then performed by rectifying the input views to a canonical fronto-parallel viewpoint (as described above and illustrated in FIGS. 4*a* and 4*b*), and performing photometric stereo. According to a previous technique this rectification is performed without prior metric knowledge of the surface. This is done by performing multiple passes of reconstruction. In the first a planar surface is assumed, and rectification performed. Typically a large number of artefacts will be seen in the rectified views due to e.g. parallax effects in the input images. This leads to a limited accuracy geometric recovery. In the second pass the approximate recovery from the first is used to perform fully 3D rectification, allowing for improved rectification of the original images set and leading to a much improved subsequent geometric recovery.

This previous approach is quite limited in nature and in particular to perform integration of the acquired photometric data (i.e. the solution of Eqn 5) requires hand marking a number of sparse correspondences in the input images to acquire a small set of truly metric data via triangulation. This is time consuming for the user and often inaccurate. With the system according to this embodiment of the invention, the laser striper is applied to acquire a "stripe" of truly geometric data from the surface in each input image. Combining information across multiple images allows a relatively large number of metric samples to be taken simultaneously with the photometric data. This is insufficient for detailed surface recovery but provides enough information for the integration of the photometric data in an automated manner. In doing so it removes the need for hand marking points across input images and allows much more accurate and timely processing.

We claim:

1. A scanner system for scanning an object, the system comprising:
a scanner device; a target independent of the object; and a processor,
wherein the scanner device is a hand-held device and comprises: an emitter for projecting patterned light on the object; and a sensor for capturing images of the object,
wherein the object and predetermined geometric features of the target are simultaneously visible to the sensor, and wherein the processor is configured to determine the location of the sensor with respect to the object,
wherein the processor is configured, in use, to generate geometric data, comprising a three-dimensional model of the object, on the basis of images of the object with the patterned light projected thereon by the emitter,
wherein the scanner device further comprises a light source for directionally illuminating the object, and the sensor is configured to capture photometric images of the object illuminated by the light source,
wherein the processor is configured, in use, to generate a set of photometric images for the object when illuminated from different directions by the light source, and
wherein the processor is configured, in use, to combine the geometric data, the set of photometric images and location of the sensor with respect to the object for each photometric image, by a rectification process, to output a model comprising geometric information on the object together with photometric information spatially registered with the geometric information.

2. The scanner system according to claim 1, further comprising a filter applied by the processor to combine the geometric data and the set of photometric images.

3. The scanner system according to claim 2, wherein the filter comprises a Wiener filter.

4. The scanner system according to claim 1, wherein the emitter comprises a laser stripe projector.

5. The scanner system according to claim 1, wherein the light source is positioned at or adjacent to the sensor to illuminate the object from substantially the same direction from which it is viewed by the sensor.

6. The scanner system according to claim 1, wherein the light source comprises a ring of LED sources around the sensor.

7. The scanner system according to claim 1, wherein the scanner device is moveable in use.

8. The scanner system according to claim 1, arranged such that the object can be placed between the scanner device and the target.

9. The scanner system according to claim 1, wherein the target is arranged to be placed on the object.

10. The scanner system according to claim 1, wherein the target comprises an aperture through which the object can be viewed.

11. The scanner system according to claim 1, wherein the object comprises a three-dimensional article.

12. The scanner system according to claim 1, wherein the object comprises a surface or portion of a surface.

13. The scanner system according to claim 1, wherein the emitter, sensor and light source are provided on a main body and have fixed, predetermined relative positions.

14. The scanner system according to claim 1, wherein at least a portion of the target is of predetermined reflectivity.

15. The scanner system according to claim 1, wherein the processor is configured to provide feedback to a user of the system regarding at least one direction from which to capture a further image of the object on the basis of geometric data and/or photometric data generated from previous images.

16. The scanner system according to claim 1, comprising only a single said sensor for capturing images of the object.

17. A method for scanning an object using a hand-held scanner device comprising an emitter for projecting patterned light on the object, a sensor for capturing images of the object, and a light source for directionally illuminating the object, and a target independent of the object and having predetermined geometric features, the method comprising:
simultaneously capturing images of the object and the geometric features of the target using the sensor, the target being in a fixed position relative to the object;
determining the location of the sensor with respect to the object on the basis of the captured images;
projecting patterned light on the object using the emitter;
generating geometric data, comprising a three-dimensional model of the object, on the basis of images of the object with the patterned light projected thereon;
directionally illuminating the object using the light source;
generating a set of photometric images for the object when illuminated from different directions by the light source; and
combining the geometric data, the set of photometric images and location of the sensor with respect to the object for each photometric image, by a rectification process, to output a model comprising geometric information on the object together with photometric information spatially registered with the geometric information.

18. The method according to claim 17, wherein the combining comprises applying a filter to combine the geometric data and the set of photometric images.

19. The method according to claim 18, wherein the filter comprises a Wiener filter.

20. The method according to claim 17, wherein the patterned light is projected on the object by a laser stripe projector.

21. The method according to claim 17, wherein the object is directionally illuminated from substantially the same direction as that from which the images are captured by the sensor.

22. The method according to claim 17, wherein the object is illuminated by a light source comprising a ring of LED sources around the sensor.

23. The method according to claim 17, further comprising moving the sensor and light source between capturing successive images.

24. The method according to claim 17, comprising placing the object between the sensor and the target.

25. The method according to claim 17, comprising placing the target on the object.

26. The method according to claim 17, wherein the object comprises a three-dimensional article.

27. The method according to claim 17, wherein the object comprises a surface or portion of a surface.

28. The method according to claim 17, comprising providing the target with at least a portion of predetermined reflectivity.

29. The method according to claim 17, comprising determining the direction of illumination of the object in images in which the object is illuminated by the light source.

30. The method according to claim 17, comprising repeating all of the steps to iteratively refine the output model.

31. The method according to claim 17, wherein the projecting of patterned light on the object; the directionally illuminating of the object using a light source; and the capturing of images of the object and target features simultaneously using the sensor, are performed simultaneously.

32. The method according to claim 17, further comprising providing feedback to a user of the method regarding at least one direction from which to capture a further image of the object on the basis of geometric data and/or photometric data generated from previous images.

33. The method according to claim 17, wherein the images of the object are obtained using a single sensor.

34. A scanner system for scanning an object using a target independent of the object and having predetermined geometric features, the system comprising:

a hand-held scanner device comprising an emitter for projecting patterned light on the object, a light source for directionally illuminating the object, and a sensor for capturing images; and a processor configured to determine the location of the sensor with respect to the object; to generate geometric data, comprising a three-dimensional model of the object, based on images of the object with the patterned light projected thereon by the emitter; to generate a set of photometric images for the object when illuminated from different directions by the light source; and to combine the geometric data, the set of photometric images and location of the sensor with respect to the object for each photometric image, by a rectification process, to output a model comprising geometric information on the object together with photometric information spatially registered with the geometric information.

* * * * *